(12) United States Patent
Trim et al.

(10) Patent No.: US 11,301,244 B1
(45) Date of Patent: Apr. 12, 2022

(54) MACHINE LEARNING BASED TRACKING OF DERIVAITIVE CODE

(71) Applicant: International Business Machines Corporation, Armonk, NY (US)

(72) Inventors: Craig M. Trim, Ventura, CA (US); Natalie Watkins, Austin, TX (US); Hemant Kumar Sivaswamy, Pune (IN); Zachary A. Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/098,480

(22) Filed: Nov. 16, 2020

(51) Int. Cl.
| | | |
|---|---|---|
| G06F 8/73 | (2018.01) | |
| G06F 8/71 | (2018.01) | |
| G06K 9/62 | (2022.01) | |
| G06F 8/41 | (2018.01) | |
| G06N 20/00 | (2019.01) | |

(52) U.S. Cl.
CPC ............... *G06F 8/73* (2013.01); *G06F 8/433* (2013.01); *G06F 8/71* (2013.01); *G06K 9/6215* (2013.01); *G06N 20/00* (2019.01)

(58) Field of Classification Search
CPC .. G06F 8/433; G06F 8/71; G06F 8/73; G06N 20/00; G06K 9/6215
See application file for complete search history.

(56) References Cited

U.S. PATENT DOCUMENTS

| | | | |
|---|---|---|---|
| 7,069,541 B2 | 6/2006 | Dougherty et al. | |
| 7,500,222 B2 | 3/2009 | Bates et al. | |
| 7,631,011 B2 | 12/2009 | Kulkarni et al. | |
| 8,375,361 B2 | 2/2013 | Bell et al. | |
| 8,490,054 B2 | 7/2013 | Dattathreya | |
| 9,195,566 B2* | 11/2015 | Huang | G06F 11/362 |
| 9,201,646 B2* | 12/2015 | Balachandran | G06F 8/71 |
| 9,262,134 B2* | 2/2016 | Kelapure | G06F 8/71 |
| 9,870,224 B1* | 1/2018 | Raju | G06F 8/10 |
| 9,928,160 B2 | 3/2018 | Champlin-Scharff et al. | |
| 10,379,992 B2* | 8/2019 | Fletcher | G06F 11/3692 |
| 10,671,373 B1 | 6/2020 | Walker et al. | |

(Continued)

FOREIGN PATENT DOCUMENTS

| | | |
|---|---|---|
| CN | 106294112 A | 1/2017 |
| KR | 1009356851 A | 6/2009 |

OTHER PUBLICATIONS

"Best Application Modernization Services 2020", 360 Quadrants, Printed Sep. 14, 2020, 6 pages, <https://www.360quadrants.com/software/application-modernization-services>.

(Continued)

*Primary Examiner* — Douglas M Slachta
(74) *Attorney, Agent, or Firm* — Sonny Z. Zhan

(57) ABSTRACT

In an approach for using machine learning to track programming code derivatives of source code, a processor captures the source code to track iterations of the source code. A processor detects a change of the source code. A processor analyzes derivative code from the source code for correlation with the source code based on similarity. A processor determines that one or more functions of the derivative code are related to the change of the source code based on the correlation. A processor highlights the related one or more functions of the derivative code.

17 Claims, 4 Drawing Sheets

(56) References Cited

U.S. PATENT DOCUMENTS

| | | | | |
|---|---|---|---|---|
| 2009/0210855 A1* | 8/2009 | Ramanathan | | G06F 8/77 717/102 |
| 2010/0131940 A1* | 5/2010 | Jazdzewski | | G06F 8/71 717/170 |
| 2010/0153917 A1* | 6/2010 | Kramer | | G06F 8/71 717/121 |
| 2011/0321007 A1* | 12/2011 | Marum | | G06F 8/65 717/113 |
| 2013/0007700 A1* | 1/2013 | Villar | | G06F 16/9535 717/109 |
| 2014/0053135 A1* | 2/2014 | Bird | | G06F 8/71 717/124 |
| 2014/0173561 A1* | 6/2014 | Toub | | G06F 8/71 717/123 |
| 2014/0331202 A1* | 11/2014 | Fukuda | | G06F 8/751 717/123 |
| 2016/0179508 A1* | 6/2016 | Bates | | G06F 11/36 717/121 |
| 2018/0136933 A1* | 5/2018 | Kogan | | G06F 16/148 |
| 2018/0276103 A1* | 9/2018 | Woulfe | | G06F 11/362 |
| 2018/0357511 A1* | 12/2018 | Misra | | G06K 9/623 |
| 2020/0174907 A1* | 6/2020 | Lundquist | | G06F 8/71 |
| 2020/0225945 A1* | 7/2020 | Wright | | G06N 7/005 |

OTHER PUBLICATIONS

"Machine vision can spot unknown links between classic artworks", MIT Technology Review, Jul. 31, 2019, 9 pages, <https://www.technologyreview.com/s/614018/machine-vision-can-spot-unknown-links-between-classic-artworks/>.

"Save time by finding and fixing bugs early", DeepCode: Semantic static code analysis for better software, Printed Sep. 14, 2020, 9 pages, <https://www.deepcode.ai/>.

Baydin et al., "Automatic Differentiation in Machine Learning: a Survey", Journal of Machine Learning Research 18 (2018) 1-43 Submitted Aug. 17; Published Apr. 18, 43 pages, <http://jmlr.org/papers/volume18/17-468/17-468.pdf>.

Dias et al., "Using text analysis to quantify the similarity and evolution of scientific disciplines", Royal Society Open Science, Jan. 2018; 5 (1): 171545, 12 pages, <https://www.ncbi.nlm.nih.gov/pmc/articles/PMC5792934/>.

Ragkhitwetsagul et al.,"A comparison of code similarity analysers", Empirical Software Engineering, vol. 23, 2018, pp. 2464-2519, <https://link.springer.com/article/10.1007/s10664-017-9564-7>.

Warren, Tom, "Microsoft completes GitHub acquisition", The Verge, Oct. 26, 2018, 3 pages, <https://www.theverge.com/2018/10/26/17954714/microsoft-github-deal-acquisition-complete>.

* cited by examiner

MACHINE LEARNING BASED TRACKING OF DERIVAITIVE CODE

BACKGROUND

The present disclosure relates generally to the field of machine learning, and more particularly to using machine learning to track programming code derivatives of a source code.

In computing, source code is any collection of code, with or without comments, written using a human-readable programming language, usually as plain text. The source code of a program may be specially designed to facilitate the work of computer programmers, who specify the actions to be performed by a computer mostly by writing source code. Source code management is a class of systems responsible for managing changes to computer programs, documents, large web sites, or other collections of information. Source code management may be used to track modifications to a source code repository. Source code management may track a running history of changes to a code base. Machine learning refers to a wide variety of algorithms and methodologies that enable a system to improve the performance over time as the system obtains more data and learns from the data.

SUMMARY

Aspects of an embodiment of the present disclosure disclose an approach for using machine learning to track programming code derivatives of source code. A processor captures the source code to track iterations of the source code. A processor detects a change of the source code. A processor analyzes derivative code from the source code for correlation with the source code based on similarity. A processor determines that one or more functions of the derivative code are related to the change of the source code based on the correlation. A processor highlights the related one or more functions of the derivative code.

DETAILED DESCRIPTION

The present disclosure is directed to systems and methods for using machine learning to track programming code derivatives of a source code.

Embodiments of the present disclosure recognize a need for keeping track of a source code having direct interdependencies and indirect interdependencies. Embodiments of the present disclosure disclose tracking segments of code and managing code dependencies. Embodiments of the present disclosure disclose using machine learning to track code derivatives of a specific parent code. Embodiments of the present disclosure disclose identifying similarities between source and derivative codes by considering time, user commentary, dependencies within the code's content, and textual similarities to surface which segments of a code are interrelated. Embodiments of the present disclosure disclose comparing a full script of multiple projects for sectional comparisons. Embodiments of the present disclosure disclose systems and methods that look at code contributions and origin, capture derivative implementations, and track any root modifications and commentary for downstream improvement opportunities.

Figure 1:
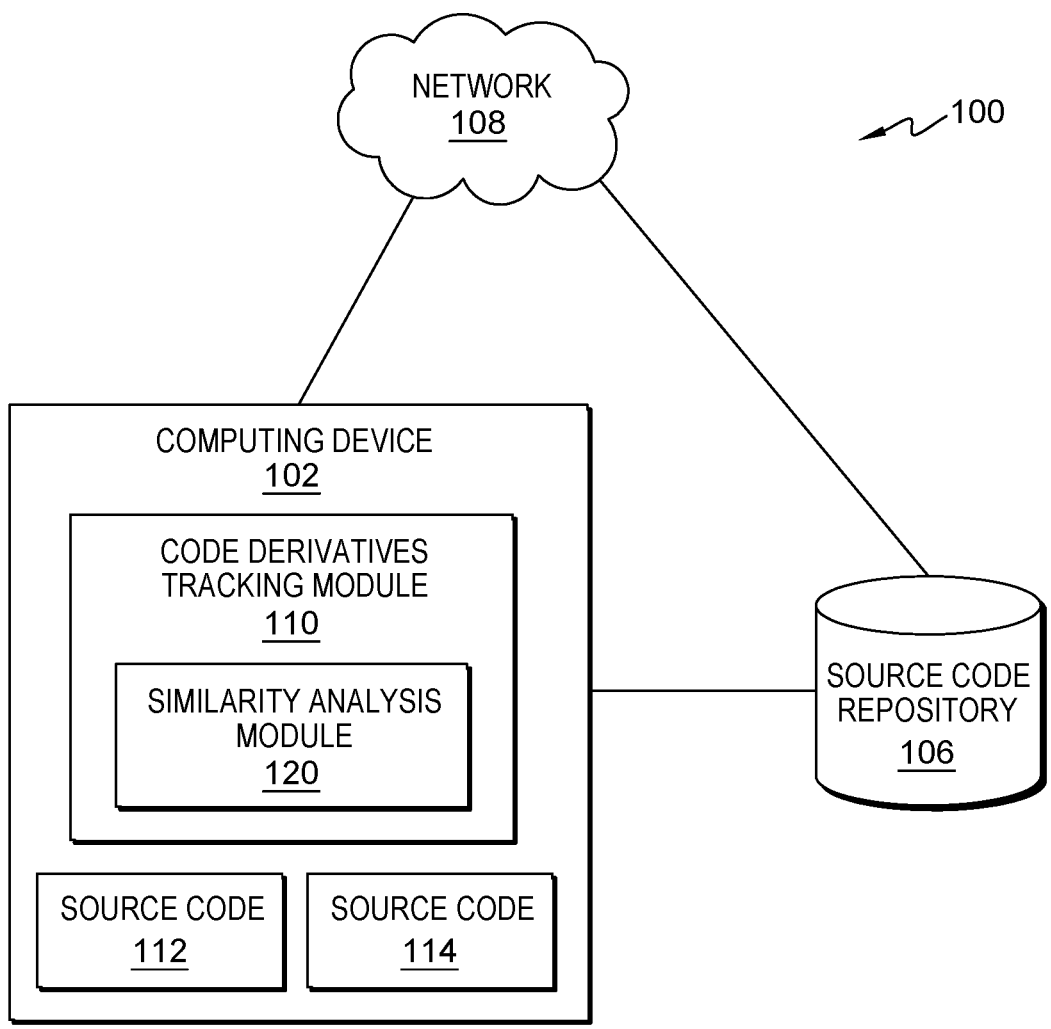
FIG. 1 is a functional block diagram illustrating a code derivatives tracking environment, in accordance with an embodiment of the present disclosure.

The present disclosure will now be described in detail with reference to the Figures. FIG. 1 is a functional block diagram illustrating code derivatives tracking environment, generally designated 100, in accordance with an embodiment of the present disclosure.

In the depicted embodiment, code derivatives tracking environment 100 includes computing device 102, source code repository 106, and network 108. In one or more embodiments, source code repository 106 may be a repository for source code 112. A user may create source code 112 and save source code 112 in an integrated development environment to source code repository 106.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to code derivatives tracking module 110 and network 108 and is capable of processing program instructions and executing code derivatives tracking module 110, in accordance with an embodiment of the present disclosure. Computing device 102 may include internal and external hardware components, as depicted and described in further detail with respect to FIG. 4.

Further, in the depicted embodiment, computing device 104 includes code derivatives tracking module 110, source code 112, and derivative code 114. In the depicted embodiment, code derivatives tracking module 110, source code 112, and derivative code 114 are located on computing device 104. However, in other embodiments, code derivatives tracking module 110, source code 112, and derivative code 114 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 104 and code derivatives tracking module 110, source code 112, and derivative code 114, in accordance with a desired embodiment of the disclosure.

In one or more embodiments, source code 112 may be from source code repository 106. In another embodiment, source code 112 may be from an online source. A user may create source code 112 and save source code 112 in an integrated development environment to source code repository 106. In one or more embodiments, derivative code 114 is derivative from source code 112. Derivative code 114 may be created based on source code 112. For example, a user may change a portion of source code 112 and create derivative code 114. Derivative code 114 may be generated in other suitable methods based on source code 112. Derivative code 114 may include direct and indirect derivatives from source code 112. Derivative code 114 may have a direct interdependency on source code 112. Derivative code 114 may have an indirect interdependency on source code 112.

In one or more embodiments, code derivatives tracking module 110 is configured to capture source code 112 to track iterations of source code 112. Code derivatives tracking module 110 may use machine learning to track derivative code 114 of source code 112. Code derivatives tracking module 110 may retrieve source function and store the source function as part of source code 112 in an integrated development environment. Code derivatives tracking module 110 may capture source code 112 to track iterations and may mark source code 112 as a root.

In one or more embodiments, code derivatives tracking module 110 is configured to detect changes of source code 112. Code derivatives tracking module 110 may search code contributions and origin of source code 112. Code derivatives tracking module 110 may capture derivative implementations of source code 112. Code derivatives tracking module 110 may track root modifications and commentary for downstream improvement opportunities. Code derivatives tracking module 110 may capture changes online regarding source code 112. Code derivatives tracking module 110 may monitor comments to determine if a new code is added, modified, or re-ranked higher than the current implementation to let a user know of an improvement opportunity.

In one or more embodiments, code derivatives tracking module 110 is configured to analyze derivative code 114 derived from source code 112 for correlation based on similarity. Code derivatives tracking module 110 may compare each function in derivative code 114 to source code 112 for similarity using deep learning techniques. Code derivatives tracking module 110 may scan inputs and outputs of each function in derivative code 114 comparison to corresponding portions of source code 112 for similarity. Code derivatives tracking module 110 may extract the inputs and outputs of each function in derivative code 114 based on the similarity. Code derivatives tracking module 110 may identify similarities between source code 112 and derivative code 114 by taking into account time, user commentary, and dependencies within the content of source code 112. Code derivatives tracking module 110 may identify textual similarities to surface which segments of source code 112 and derivative code 114 are interrelated. Code derivatives tracking module 110 may compare a full script of multiple projects for sectional comparisons between source code 112 and derivative code 114. Code derivatives tracking module 110 may store and rank related functions between source code 112 and derivative code 114 hierarchically based on metadata, for example, creation time, open code chunks, and activities from a user, e.g., watching copy and paste behavior.

Code derivatives tracking module 110 may utilize deep learning techniques and linguistic similarity analysis to determine code evolution by comparing each function and logic chunk embedded in an application against source code 112 as a root. Code derivatives tracking module 110 may earmark each derived function that has originated, evolved, or based off the root function as the tier one code. Code derivatives tracking module 110 may analyze similar code deriving (e.g., derivative code 114) from the source function (e.g., source code 112) and installing a watcher on each associated function derived or adapted from the source function. Code derivatives tracking module 110 may recursively process applications for functions or logic chunks embedded comprising derivations or adaptations of the tier one code. Code derivatives tracking module 110 may label the functions or logic chunks embedded comprising derivations or adaptations of the tier one code as a tier two code. Code derivatives tracking module 110 may scan each logical function, inputs, and outputs of the applications comprising source code 112, tier one code and tier two code and may extract logic chunks that have similar inputs, outputs and function subcomponents from derivative code 114 based on source code 112.

In one or more embodiments, code derivatives tracking module 110 is configured to determine that one or more functions of derivative code 114 are related to a change of source code 112 based on the similarity analysis. Code derivatives tracking module 110 may return related functions and may determine what changes are related and need to be similarly applied to derivative code 114. Code derivatives tracking module 110 may mark source code 112 as a root. Code derivatives tracking module 110 may mark each function in derivative code 114 that is derived from the source function of the root as a tier one code. Code derivatives tracking module 110 may recursively analyze functions having derivations of the root and the tier one code.

In one or more embodiments, code derivatives tracking module 110 is configured to highlight the related one or more functions of derivative code 114. In response of modification of the root and or the tier one code from source code 112, code derivatives tracking module 110 may highlight all derivations related to the modified code, e.g., derivative code 114. Code derivatives tracking module 110 may alert validation of an improvement opportunity to the related code that is derived from the root or the tier one code being modified.

In one or more embodiments, code derivatives tracking module 110 is configured to recommend a suggestion of modifying the related one or more functions of derivative code 114 based on the change of source code 112. Code derivatives tracking module 110 may recommend transformations or codes to move over to make the change easier. Code derivatives tracking module 110 may make a recommendation of changing derivative code 114 based on the change of source code 112.

In the depicted embodiment, code derivatives tracking module 110 includes similarity analysis module 120. In one or more embodiments, similarity analysis module 120 is configured to analyze derivative code 114 derived from source code 112 for correlation based on similarity. Similarity analysis module 120 may compare each function in derivative code 114 to source code 112 for similarity using deep learning techniques. Similarity analysis module 120 may scan inputs and outputs of each function in derivative code 114 comparison to corresponding portions of source code 112 for similarity. Similarity analysis module 120 may extract the inputs and outputs of each function in derivative code 114 based on the similarity. Similarity analysis module 120 may identify similarities between source code 112 and derivative code 114 by taking into account time, user commentary, and dependencies within the content of source code 112. Similarity analysis module 120 may identify textual similarities to surface which segments of source code 112 and derivative code 114 are interrelated. Similarity analysis module 120 may compare a full script of multiple projects for sectional comparisons between source code 112 and derivative code 114. Similarity analysis module 120 may store and rank related functions between source code 112 and derivative code 114 hierarchically based on metadata, for example, creation time, open code chunks, and activities from a user, e.g., watching copy and paste behavior.

Similarity analysis module 120 may utilize deep learning techniques and linguistic similarity analysis to determine code evolution by comparing each function and logic chunk embedded in an application against source code 112 as a root. Similarity analysis module 120 may earmark each derived function that has originated, evolved, or based off the root function as the tier one code. Similarity analysis module 120 may analyze similar code deriving (e.g., derivative code 114) from the source function (e.g., source code 112) and installing a watcher on each associated function derived or adapted from the source function. Similarity analysis module 120 may recursively process applications for functions or logic chunks embedded comprising derivations or adaptations of the tier one code. Similarity analysis module 120 may label the functions or logic chunks embedded comprising derivations or adaptations of the tier one code as a tier two code. Similarity analysis module 120 may scan each logical function, inputs, and outputs of the applications comprising source code 112, tier one code and tier two code and may extract logic chunks that have similar inputs, outputs and function subcomponents from derivative code 114 based on source code 112.

Figure 2:
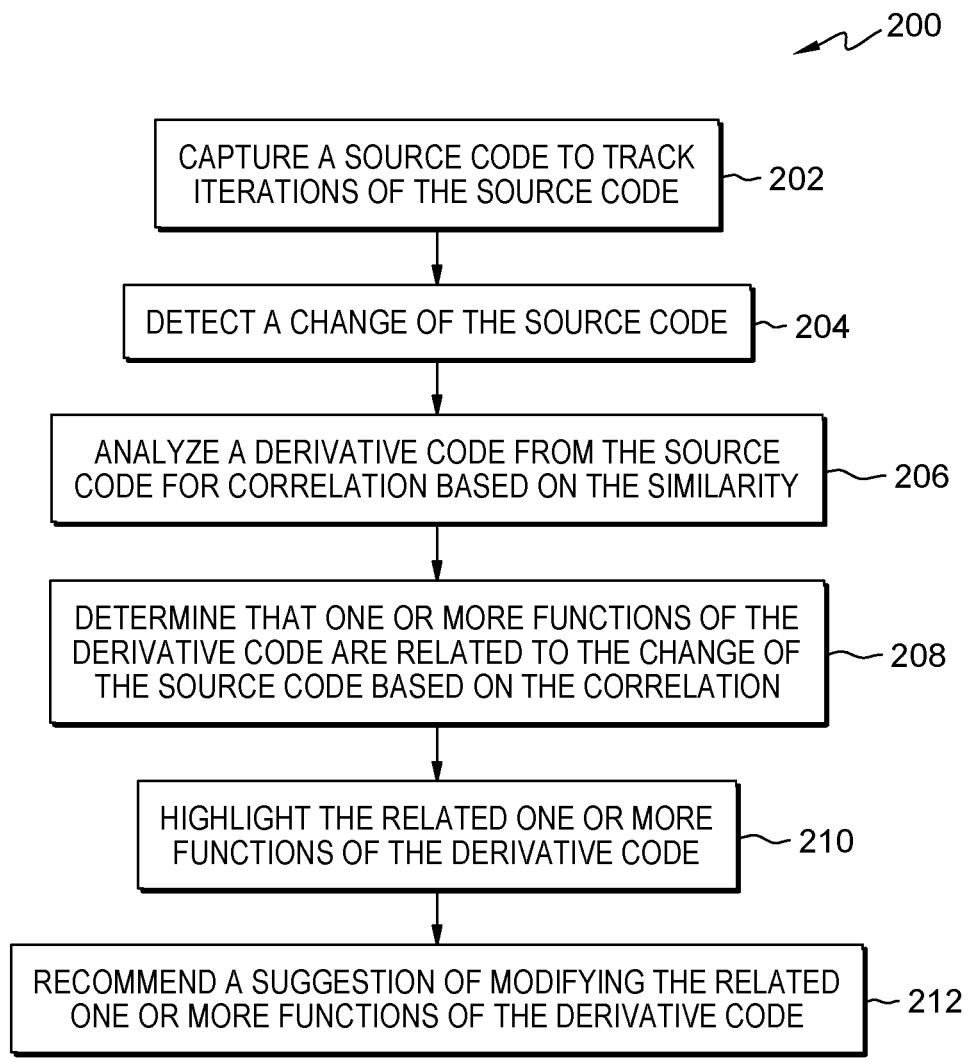
FIG. 2 is a flowchart depicting operational steps of a code derivatives tracking module within a computing device of FIG. 1, in accordance with an embodiment of the present disclosure.

FIG. 2 is a flowchart 200 depicting operational steps of code derivatives tracking module 110 in accordance with an embodiment of the present disclosure.

Code derivatives tracking module 110 operates to capture source code 112 to track iterations of source code 112. Code derivatives tracking module 110 also operates to detect changes of source code 112. Code derivatives tracking module 110 operates to analyze derivative code 114 derived from source code 112 for correlation based on similarity. Code derivatives tracking module 110 operates to determine that one or more functions of derivative code 114 are related to a change of source code 112 based on the similarity analysis. Code derivatives tracking module 110 operates to highlight the related one or more functions of derivative code 114. Code derivatives tracking module 110 operates to recommend a suggestion of modifying the related one or more functions of derivative code 114 based on the change of source code 112.

In step 202, code derivatives tracking module 110 captures source code 112 to track iterations of source code 112. Code derivatives tracking module 110 may use machine learning to track derivative code 114 of source code 112. Code derivatives tracking module 110 may retrieve source function of source code 112. Code derivatives tracking module 110 may store the source function as part of source code 112 in an integrated development environment. Code derivatives tracking module 110 may capture source code 112 to track iterations and may mark source code 112 as a root.

In step 204, code derivatives tracking module 110 detects changes of source code 112. Code derivatives tracking module 110 may monitor each associated function derived from source code 112. Code derivatives tracking module 110 may search code contributions and origin of source code 112. Code derivatives tracking module 110 may capture derivative implementations of source code 112. Code derivatives tracking module 110 may track root modifications and commentary for downstream improvement opportunities. Code derivatives tracking module 110 may capture changes online regarding source code 112. Code derivatives tracking module 110 may monitor comments to determine if a new code is added, modified, or re-ranked higher than the current implementation to let a user know of an improvement opportunity.

In step 206, code derivatives tracking module 110 analyzes derivative code 114 derived from source code 112 for correlation with the source code based on similarity. Code derivatives tracking module 110 may compare each function in derivative code 114 to source code 112 for similarity using deep learning techniques. Code derivatives tracking module 110 may analyze similar code deriving from source code 112. Code derivatives tracking module 110 may scan inputs and outputs of each function in derivative code 114 comparison to corresponding portions of source code 112 for similarity. Code derivatives tracking module 110 may extract the inputs and outputs of each function in derivative code 114 based on the similarity. Code derivatives tracking module 110 may identify similarities between source code 112 and derivative code 114 by taking into account time, user commentary, and dependencies within the content of source code 112. Code derivatives tracking module 110 may identify textual similarities to surface which segments of source code 112 and derivative code 114 are interrelated. Code derivatives tracking module 110 may compare a full script of multiple projects for sectional comparisons between source code 112 and derivative code 114. Code derivatives tracking module 110 may store and rank related functions between source code 112 and derivative code 114 hierarchically based on metadata, for example, creation time, open code chunks, and activities from a user, e.g., watching activities of copying and pasting.

Code derivatives tracking module 110 may utilize deep learning techniques and linguistic similarity analysis to determine code evolution by comparing each function and logic chunk embedded in an application against source code 112 as a root. Code derivatives tracking module 110 may earmark each derived function that has originated, evolved, or based off the root function as the tier one code. Code derivatives tracking module 110 may analyze similar code deriving (e.g., derivative code 114) from the source function (e.g., source code 112) and installing a watcher on each associated function derived or adapted from the source function. Code derivatives tracking module 110 may recursively process applications for functions or logic chunks embedded comprising derivations or adaptations of the tier one code. Code derivatives tracking module 110 may label the functions or logic chunks embedded comprising derivations or adaptations of the tier one code as the tier two code. Code derivatives tracking module 110 may scan each logical function, inputs, and outputs of the applications comprising source code 112, tier one code and tier two code and may extract logic chunks that have similar inputs, outputs and function subcomponents from derivative code 114 based on source code 112.

In step 208, code derivatives tracking module 110 determines that one or more functions of derivative code 114 are related to a change of source code 112 based on the similarity analysis. Code derivatives tracking module 110 may return related functions and may determine what changes are related and need to be similarly applied to derivative code 114. Code derivatives tracking module 110 may mark source code 112 as a root. Code derivatives tracking module 110 may mark each function in derivative code 114 that is derived from the source function of the root as a tier one code. Code derivatives tracking module 110 may recursively analyze functions having derivations of the root and the tier one code. Code derivatives tracking module 110 may determine that an application is deriving the source function to be used within the application by comparing each application function against the source function of source code 112.

In step 210, code derivatives tracking module 110 highlights the related one or more functions of derivative code 114 for a possible modification to a user. In response of modification of the root and or the tier one code from source code 112, code derivatives tracking module 110 may highlight all derivations related to the modified code, e.g., derivative code 114. Code derivatives tracking module 110 may alert validation of an improvement opportunity to the related code that is derived from the root or the tier one code being modified.

In step 212, code derivatives tracking module 110 recommends a suggestion to modify the related one or more functions of derivative code 114 based on the change of source code 112. Code derivatives tracking module 110 may recommend transformations or codes to move over to make the change easier. Code derivatives tracking module 110 may make a recommendation of changing derivative code 114 based on the change of source code 112.

Figure 3:
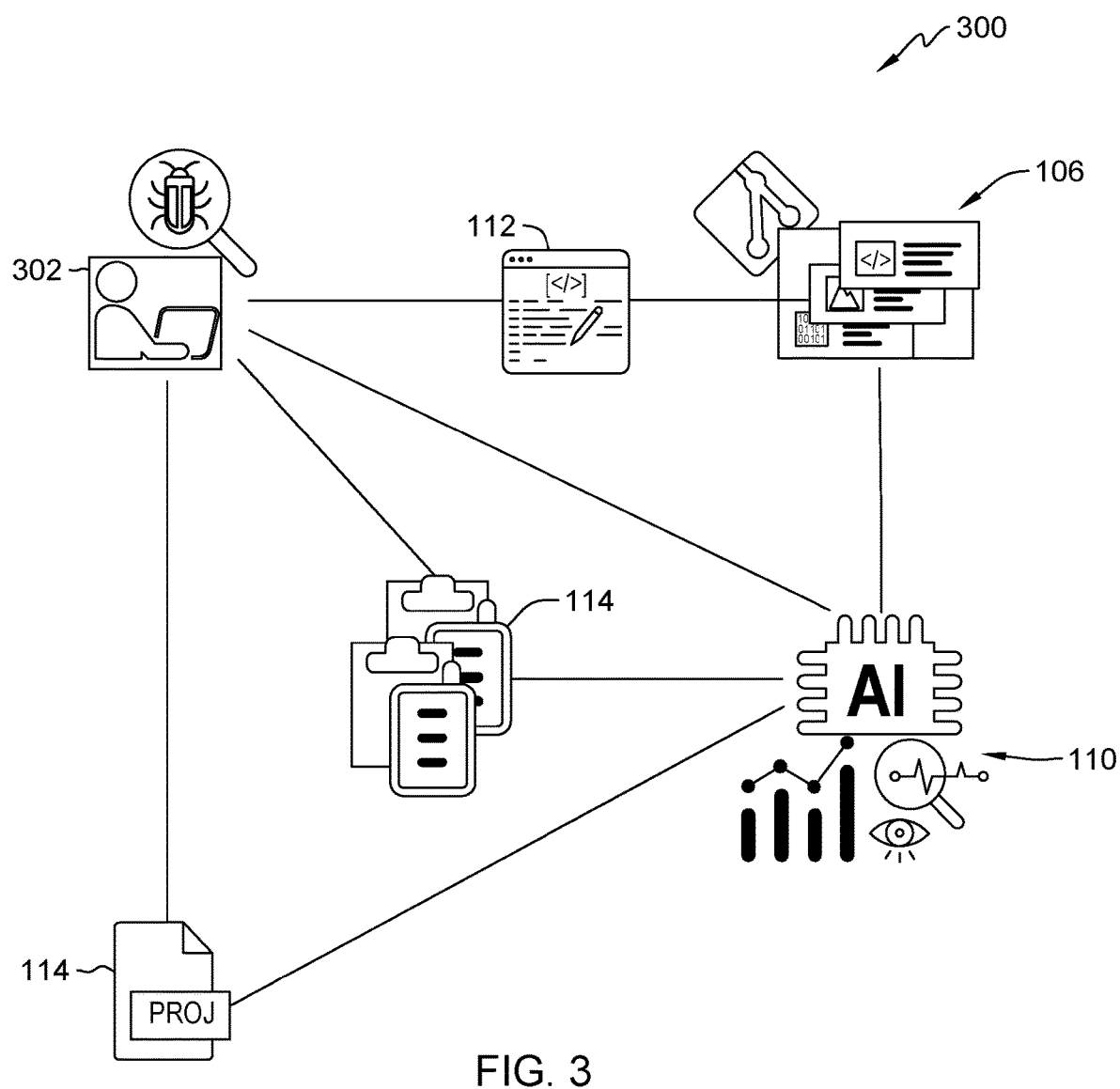
FIG. 3 illustrates an exemplary functional flowchart of the code derivatives tracking module of the computing device of FIG. 1, in accordance with an embodiment of the present disclosure.

FIG. 3 illustrates an exemplary functional flowchart 300 of code derivatives tracking module 110 in accordance with one or more embodiments of the present disclosure.

In the example of FIG. 3, user 302 may develop an application in an integrated development environment (e.g., source code repository 106) and may use source code repository 106 to keep changes up to date with source code 112 for the application. In an example, source code repository 106 may be a large code repository that is an accessible resource for user 302 to host projects, documentation, and codes. Source code repository 106 may be a form of social network with usual dependencies. Code derivatives tracking module 110 may retrieve source function and store the source function as part of source code 112 in the integrated development environment. User 302 may copy and paste a function (e.g., derivative code 114) multiple times throughout the application. User 302 may tweak the function based on the initial implementation where user 302 copies and pastes. Certain other code chunks may be directly based off the initial implementation where user 302 copies, pastes the function, then tweaks slightly. User 302 discovers a bug in the root function in source code 112 and may correct the root function in source code 112. When user 302 corrects the root function, code derivatives tracking module 110 may detect the core change and may perform a similarity analysis in derivative code 114. Code derivatives tracking module 110 may return likely related functions in derivative code 114. Code derivatives tracking module 110 may highlight the related functions to user 302 to determine what changes are related and need to be similarly applied. Code derivatives tracking module 110 may recommend transformations or codes to move over to make the change easier for user 302.

Figure 4:
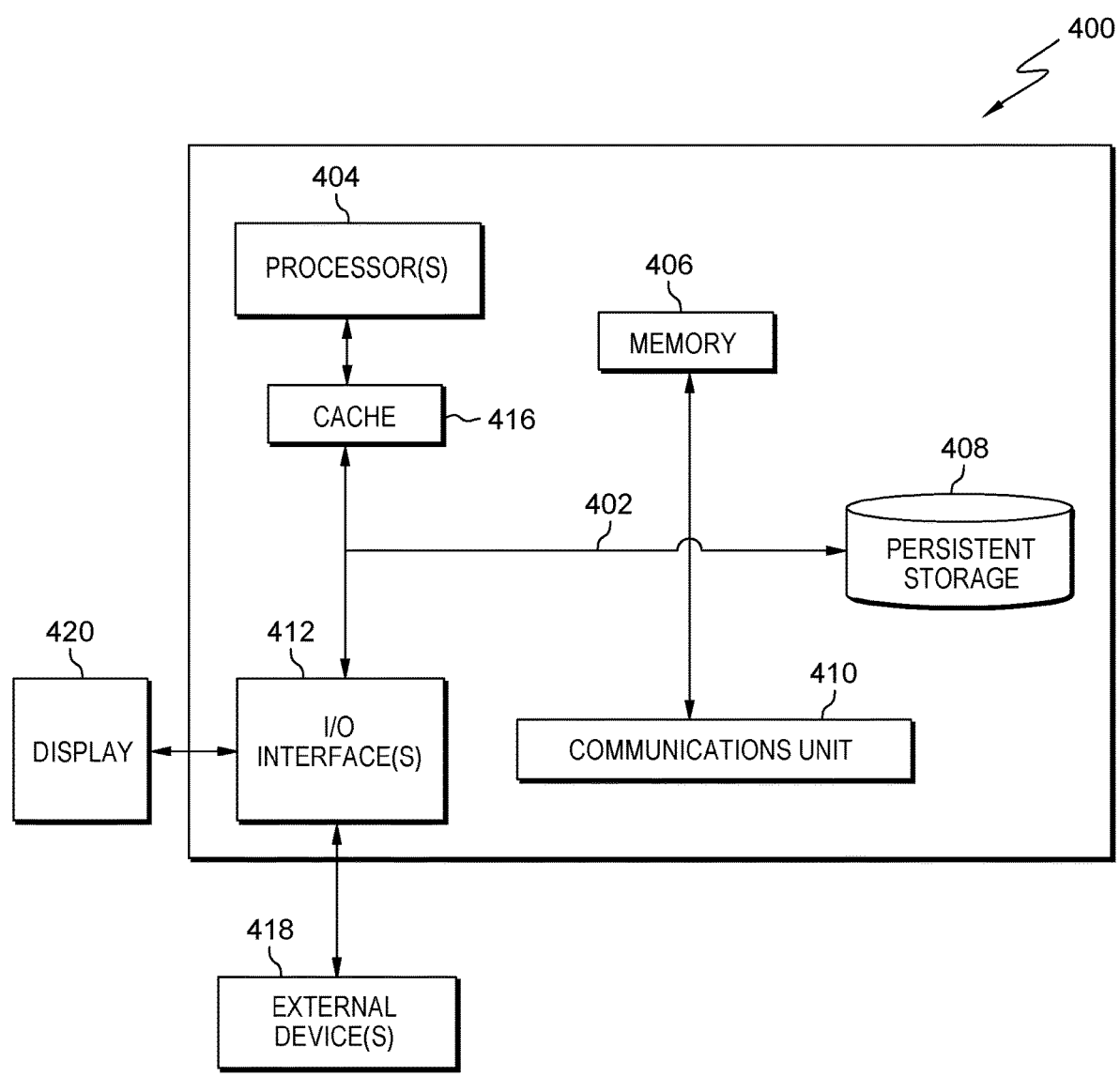
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Code derivatives tracking module 110 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Code derivatives tracking module 110 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., code derivatives tracking module 110 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
capturing, by one or more processors, source code to track iterations of the source code;
detecting, by one or more processors, a change of the source code;
analyzing, by one or more processors, derivative code from the source code for correlation with the source code based on similarity;
marking, by one or more processors, the source code as a root;
marking, by one or more processors, each function that is derived from the source function of the root as a tier one code;
recursively analyzing, by one or more processors, functions having derivations of the root and the tier one code;
detecting, by one or more processors, modification of the root and the tier one code;
highlighting, by one or more processors, the derivations related to the modified code;
generating, by one or more processors, an alert on the modified code;
sending, by one or more processors, the alert for validation of an improvement opportunity to the related code that is derived from the root or the tier one code being modified;
determining, by one or more processors, that one or more functions of the derivative code are related to the change of the source code based on the correlation; and
highlighting, by one or more processors, the related one or more functions of the derivative code for a possible modification.

2. The computer-implemented method of claim 1, further comprising recommending, by one or more processors, a suggestion to modify the related one or more functions of the derivative code based on the change of the source code.

3. The computer-implemented method of claim 1, wherein capturing the source code comprises creating and saving the source code in an integrated development environment.

4. The computer-implemented method of claim 1, wherein capturing the source code comprises retrieving the source code from an online source.

5. The computer-implemented method of claim 1, wherein analyzing the derivative code comprises comparing each function in the derivative code to the source code for similarity using deep learning techniques.

6. The computer-implemented method of claim 1, wherein analyzing the derivative code comprises:

scanning inputs and outputs of each function in the derivative code comparison to corresponding portions of the source code for similarity; and
extracting the inputs and outputs of each function in the derivative code based on the similarity.

7. A computer program product comprising:
one or more computer readable storage media, and program instructions collectively stored on the one or more computer readable storage media, the program instructions comprising:
program instructions to capture source code to track iterations of the source code;
program instructions to detect a change of the source code;
program instructions to analyze derivative code from the source code for correlation with the source code based on similarity;
program instructions to mark the source code as a root;
program instructions to mark each function that is derived from the source function of the root as a tier one code;
program instructions to recursively analyze functions having derivations of the root and the tier one code;
program instructions to detect modification of the root and the tier one code;
program instructions to highlight the derivations related to the modified code;
program instructions to generate an alert on the modified code;
program instructions to send the alert for validation of an improvement opportunity to the related code that is derived from the root or the tier one code being modified;
program instructions to determine that one or more functions of the derivative code are related to the change of the source code based on the correlation; and
program instructions to highlight the related one or more functions of the derivative code for a possible modification.

8. The computer program product of claim 7, further comprising:
program instructions, stored on the one or more computer-readable storage media, to recommend a suggestion to modify the related one or more functions of the derivative code based on the change of the source code.

9. The computer program product of claim 7, wherein program instructions to capture the source code comprise program instructions to create and save the source code in an integrated development environment.

10. The computer program product of claim 7, wherein program instructions to capture the source code comprise program instructions to retrieve the source code from an online source.

11. The computer program product of claim 7, wherein program instructions to analyze the derivative code comprise program instructions to compare each function in the derivative code to the source code for similarity using deep learning techniques.

12. The computer program product of claim 7, wherein program instructions to analyze the derivative code comprise:
program instructions to scan inputs and outputs of each function in the derivative code comparison to corresponding portions of the source code for similarity; and
program instructions to extract the inputs and outputs of each function in the derivative code based on the similarity.

13. A computer system comprising:
one or more computer processors, one or more computer readable storage media, and program instructions stored on the one or more computer readable storage media for execution by at least one of the one or more computer processors, the program instructions comprising:
program instructions to capture source code to track iterations of the source code;
program instructions to detect a change of the source code;
program instructions to analyze derivative code from the source code for correlation with the source code based on similarity;
program instructions to mark the source code as a root;
program instructions to mark each function that is derived from the source function of the root as a tier one code;
program instructions to recursively analyze functions having derivations of the root and the tier one code;
program instructions to detect modification of the root and the tier one code;
program instructions to highlight the derivations related to the modified code;
program instructions to generate an alert on the modified code;
program instructions to send the alert for validation of an improvement opportunity to the related code that is derived from the root or the tier one code being modified;
program instructions to determine that one or more functions of the derivative code are related to the change of the source code based on the correlation; and
program instructions to highlight the related one or more functions of the derivative code for a possible modification.

14. The computer system of claim 13, further comprising:
program instructions, stored on the one or more computer-readable storage media, to recommend a suggestion to modify the related one or more functions of the derivative code based on the change of the source code.

15. The computer system of claim 13, wherein program instructions to capture the source code comprise program instructions to create and save the source code in an integrated development environment.

16. The computer system of claim 13, wherein program instructions to analyze the derivative code comprise program instructions to compare each function in the derivative code to the source code for similarity using deep learning techniques.

17. The computer system of claim 13, wherein program instructions to analyze the derivative code comprise:
program instructions to scan inputs and outputs of each function in the derivative code comparison to corresponding portions of the source code for similarity; and
program instructions to extract the inputs and outputs of each function in the derivative code based on the similarity.

* * * * *